United States Patent [19]

Bechtold et al.

[11] Patent Number: 4,769,198
[45] Date of Patent: Sep. 6, 1988

[54] PROCESS AND APPARATUS FOR THE PLASTIC INJECTION COATING OF CELL POLES OF FINISHED PLATE GROUPS

[75] Inventors: Dieter Bechtold, Frankfurt; Rudolf Eckardt, Steinbach, both of Fed. Rep. of Germany

[73] Assignee: Varta Batterie Aktiengesellschaft, Hanover, Fed. Rep. of Germany

[21] Appl. No.: 771,969

[22] Filed: Sep. 3, 1985

[30] Foreign Application Priority Data

Sep. 22, 1984 [DE] Fed. Rep. of Germany ....... 3434900

[51] Int. Cl.⁴ .................. B26D 3/06; B29C 45/14; B29C 45/27; B29C 45/33
[52] U.S. Cl. .................................. 264/138; 83/878; 249/91; 264/272.15; 264/274; 264/278; 425/116; 425/572; 425/577; 425/588; 425/DIG. 5
[58] Field of Search .............. 264/138, 272.15, 272.19, 264/274, 275, 278, 265, 272.11, 276, 279, 1.5; 425/116, 572, 577, 588, DIG. 5; 429/180–185; 249/91, 95; 83/875, 876, 878

[56] References Cited

U.S. PATENT DOCUMENTS

| | | | |
|---|---|---|---|
| 3,799,494 | 3/1974 | McLean, Jr. | 425/572 X |
| 4,212,934 | 7/1980 | Salamon | 429/181 |
| 4,279,850 | 7/1981 | Lynch | 264/278 X |
| 4,398,785 | 8/1983 | Hedrick | 264/274 X |

FOREIGN PATENT DOCUMENTS 740361 8/1966 Canada ........................ 264/272.19

*Primary Examiner*—Jeffery Thurlow
*Assistant Examiner*—Leo B. Tentoni
*Attorney, Agent, or Firm*—Weiser & Stapler

[57] ABSTRACT

The cell poles of an electric battery, which have already been cast on a fully assembled plate group which is fixed in proper position for mounting in a holding box, are provided with a plastic coating using a dual injection mold which matches the predetermined distance between the poles. After the two mold halves are closed over the poles, a plastic melt is injected into cavities corresponding to the poles, which plastic is at the same time prevented from escaping from the mold by a gasket at the base of each cell pole, and a movable slide at the forwardmost end of each cell pole.

13 Claims, 1 Drawing Sheet

U.S. Patent   Sep. 6, 1988   4,769,198
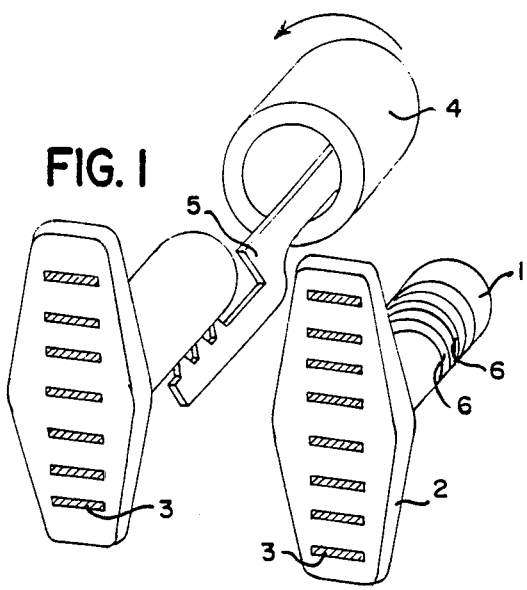
FIG. 1
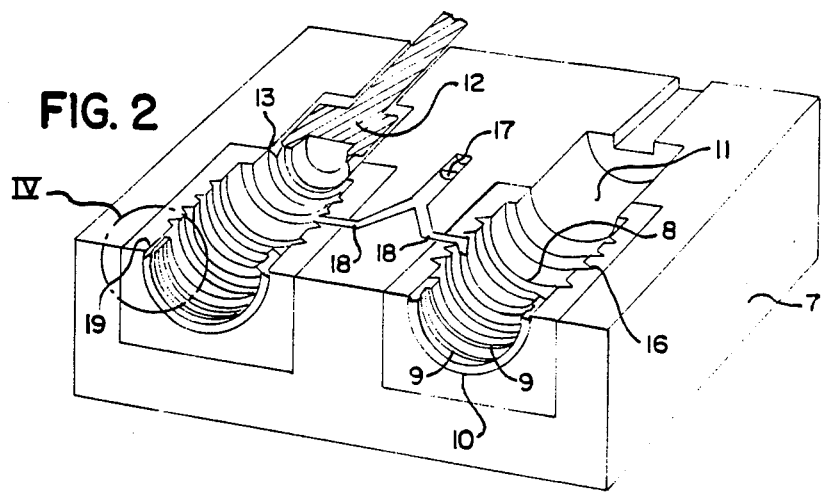
FIG. 2
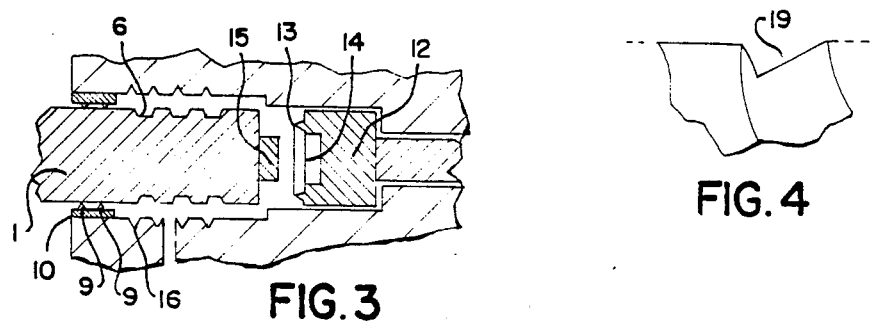
FIG. 3
FIG. 4

PROCESS AND APPARATUS FOR THE PLASTIC INJECTION COATING OF CELL POLES OF FINISHED PLATE GROUPS

BACKGROUND OF THE INVENTION

The present invention relates generally to the application of plastic coatings to the bodies of the cell poles of an electric battery, particulary cell poles which have been cast in unitary combination with a completely assembled plate group held in proper position for mounting within a holder.

Lead cell poles have long been used to make electrical connections in electric batteries. In order to promote a good, snug fit between the cell poles and the container cover through which they pass, such cell poles are advantageously provided with a plastic coating and passed through a tube of appropriate diameter provided in the cover in such a way that the required tightness for a proper fit is assured as a result of the frictional contact developed between the pole coating and the plastic material of the tube. Such pole sealing is known, for example, from DE-OS No. 27 57 568, and represents an improvement over conventional pole sealing techniques wherein lead bushes are recessed or injection-molded in the cover and later welded to the pole body, a process which is usually cumbersome, and which must take place after assembly of the battery.

The impetus to steadily reduce the time required to manufacture a battery, as a consequence of an increasing level of automation, has led to the development of means for casting the connecting straps and cell poles, including the pole inserts (made, for example, from brass), directly onto plate groups which have previously been completely assembled and placed within a holder in proper position for subsequent mounting in the cell container, all in a single operation according to a modified cast-on-strap (COS) process. However, this process eliminates the possibility of subsequent individual processing of the cell poles because the poles, which are spaced closely to one another, represent a mutual obstacle to one another. This makes the plastic injection coating of such cells poles especially difficult.

Thus, the present invention has as its primary object to provide a process which permits the plastic injection coating of the bodies of cell poles in a reliable and efficient manner, and an apparatus for carrying out such a process.

SUMMARY OF THE INVENTION

This and other objects are achieved in accordance with the present invention by taking a completely assembled plate group which is held in proper position within a holding box, and then cutting grooves into the pole bodies in those regions which are to be coated with plastic, using an appropriate cutter; moving the holding box with the poles projecting forward toward an injection mold which receives the poles in matching hollow mold cavities; sealing off the poles at both their front end and near their bases along the circumference of their bodies so that a sealed annular gap is developed between each pole body and the hollow mold cavity which surrounds it; and filling the annular gap with a plastic melt by means of injection.

An especially advantageous pretreatment of the lead poles within the framework of the present invention resides in the preparation of circumferential recesses or grooves in the initially smooth pole bodies. This creates a means for securely anchoring the plastic coating and also develops a long, contorted path which offers protection against the leakage of electrolyte. A multiple-thread cutter mounted in a cutting head is advantageously used to cut the series of grooves in each cell pole. Coaxially aligning the cutting head with a pole to be cut serves to rotate the multiple-thread cutter perpendicular to the pole and parallel to the pole axis, cutting into the surface of the pole body under a radially inwardly directed pressure. The cutting process is then repeated at the second of the cell poles provided, according to a fixed cycle, by retracting the holding box together with the plate group from the cutter and, after a lateral shift by one pole distance, again feeding the plate group to the tool.

For further detail regarding this pretreatment of the poles, as well as the plastic injection coating process which is used according to the present invention, reference is made to the discussion below, with reference to the following illustrations.

BRIEF DESCRIPTION OF THE DRAWINGS

FIG. 1 is a schematic view showing the grooving of the cell poles.

FIG. 2 is an isometric view of an injection mold used in coating the poles according to the present invention.

FIG. 3 is a cross-sectional view showing the positioning of a cell pole in the injection mold.

FIG. 4 is an enlarged elevational view of those portions of the injection mold which are shown at IV in FIG. 2.

In the several views provided, like reference numerals denote similar structure.

DETAILED DESCRIPTION OF A PREFERRED EMBODIMENT

FIG. 1 schematically illustrates a completely assembled plate group held in proper position for mounting within a holding box or fixture (not shown). This plate group is represented by the sectioned lugs 3 of the positive and negative plates of the plate group, which are encapsulated within connecting straps 2 in accordance with known cast-on-strap (COS) manufacturing techniques. Also associated with the straps 2 are cell poles 1 which extend from the plate group as shown. As is conventional, the cell poles 1 have smooth outer surface, resulting from the casting process.

A multiple-thread cutter 5 is mounted within a head 4, for movement with respect to the pole 1. In this regard, the cutter 5 is mounted so as to be approximately perpendicular to the periphery of the pole 1, while the head 4 is substantially coaxial with the pole 1. Thus, the cutter 5 is capable of being rotated in the direction of the arrow shown in FIG. 1, first about one of the poles 1 and then about the other, leaving a series of recesses 6 in each of the pole bodies after these cutting operations.

A dual injection mold, comprised of two mold halves 7, is provided in accordance with the present invention for the subsequent injection coating of the pole bodies with plastic. Referring to FIG. 2, each mold half 7 is generally comprised of two hollow, semi-cylindrical mold cavities 8 corresponding to each of the poles 1. The cavities 8 are spaced apart so that the cell poles 1, which are separated by a known and fixed distance, can be simultaneously inserted into the hollow cavities 8. The interior radius of the cavities 8 is greater than the radius of each pole body 1, by an amount corresponding to the desired thickness of the plastic coating to be prepared.

At the point of entry, the cavities 8 are narrowed to approximate the cross-section of each pole body 1 by gaskets 10 having circumferential elevations 9, so that the poles 1 are sealed near their base, along the circumference of the pole body, after their introduction into the cavities 8. The forwardmost ends of the poles 1 are also sealed to provide a sealed annular enclosure surrounding each of the poles 1. To this end, the hollow cavities 8 of the injection mold 7 extend into cup-shaped extensions 11 (injection cavities) of reduced diameter, within which cylindrical slides 12 can be moved coaxially relative to the hollow cavities. The slide 12 is shown in the retracted position in FIG. 3. As a result, the slides 12 are capable of being pressed against the forwardmost face of the pole 1 as it reaches the end of the hollow cavity 8, as is shown in FIG. 3. A ring-shaped cutting edge 13 associated with each of the slides 12 cuts slightly into the relatively soft lead face of each pole, thereby establishing an end seal. A recess 14 provided in the end of each slide 12 serves to receive the projecting end of the pole insert 15 associated with each of the cell poles 1.

The hollow cavities 8 are additionally provided with circumferential recesses 16 on their internal walls, which recesses are capable of being filled with the injection molding composition to form unitarily molded sealing lips which are important in assuring tight passage of the coated cell pole through the tube which is provided in the cover of the battery. To permit the injection of such plastic materials, the two hollow cavities 8 communicate with each other via injection channels 18, which branch off from a common plastic feed pipe 17. With reference to FIG. 4, free spaces 19 are provided at the seam of the injection mold, to receive chips which may be produced in processing the cell poles 1 for injection coating.

The injection coating process according to the present invention proceeds as follows. The two halves 7 of the injection mold are closed against the cell poles 1, simultaneously sealing each of the pole bodies at their base by means of the gaskets 10, and at their end by forward movement of the cylindrical slides 12. Subsequent injection of the plastic melt into the hollow cavities 8 fills the ring-shaped gap developed between the pole body 1 and the interior wall of the hollow cavity 8 which surrounds it. Thereafter, the cylindrical slides 12 are retracted and the halves 7 of the injection mold are opened, releasing the coated cell poles from the mold.

A particular advantage of this process is that it is focused on the dimensions of the finally assembled battery cell, which dimensions are in turn determined by the holding box for the finished plate group. Thus, tolerances in the distance between the poles and in the pole diameters are maintained at reduced values.

Although the present invention is described in connection with cell groups which have been produced by a cast-on-strap (COS) process, and wherein each of a pair of cell poles are simultaneously provided with a plastic coating in a single molding operation, it is to be understood that aspects of the present invention will also find applicability to other battery manufacturing techniques, as well as to the application of plastic coatings to individual cell poles.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. A process for the application of a plastic coating on body portions of a pair of cell poles of an electric battery, after said pair of pole bodies have been cast on a completely assembled plate group which is held in proper position for mounting in a holding box, said process comprising the steps of:

cutting circumferential grooves into each of the pole bodies in the region to be coated with plastic, by means of a cutter;

moving the holding box with the pair of poles projecting forward toward an injection mold having matching hollow cavities spaced for receiving the poles;

sealing off the poles at their forwardmost ends and hear their bases, along the circumference of their bodies, developing a ring-shaped gap between each pole body and the hollow cavity which surrounds it; and filling each of the ring-shaped gaps with a plastic melt by injection.

2. The process of claim 1 wherein the cutter is comprised of a cutter head which is capable of coaxial alignment with each pole, and a multiple-thread cutter attached to the cutter head and capable of rotating perpendicular to the axis of the pole.

3. The process of claim 2 wherein the multiple-thread cutter lies substantially perpendicular to the face of the pole, and is moved coaxially with respect to the pole by the cutter head.

4. The process of claim 1 wherein the plastic coating is provided with circumferential elevations directly molded with the coating.

5. A process for the application of a plastic coating on body portions of the cell poles of an electric battery, comprising the steps of:

cutting circumferential grooves into the pole bodies in the region to be coated with plastic;

moving the poles with the poles projecting forward toward an injection mold having cavities for receiving the poles;

sealing off the poles near their bases;

advancing a cylindrical slide into contact with the forwardmost end of each of the poles, to develop a ring-shaped gap between each pole body and the hollow mold which surrounds it; and filling the ring-shaped gap with said plastic.

6. A device for providing body portions of a pair of cell poles of an electric battery with a plastic coating after said pair of pole bodies have been cast on a completely assembled plate group which is held in proper position for mounting in a holding box, said device comprising:

two mold halves, each having two hollow cylindrical mold cavities which correspond in shape to the poles and which are spaced from each other at the same distance as the poles, so that the cell poles can be pushed into said hollow cavities, wherein the interior radius of each hollow cavity is greater than the radius of the pole body it is to receive by the thickness of the plastic coating to be provided;

a cup-shaped extension of reduced diameter extending from the hollow cavity and containing a cylindrical slide adapted for coaxial movement within the hollow cavity, to contact and seal the forwardmost ends of the cell poles by means of a ring-shaped cutting edge extending from the front face of the slide;

ring-shaped gaskets provided with circumferential elevations positioned at the point of entry of each hollow cavity and adapted to narrow the point of entry to the cross-section of each of the pole bodies;

circumferential recesses disposed over at least portions of the length of the interior walls of the hollow cavities; and injection channels in communication with the hollow cavities, and a common composition feed pipe.

7. The device of claim 6 wherein free spaces are provided for receiving waste chips along seams of the mold halves.

8. A device for providing body portions of the cells poles of an electric battery with a plastic coating, said device comprising:

two mold halves, each having at least one hollow mold cavity which corresponds in shape to the cell poles so that the cell poles can be pushed into said hollow cavity, wherein the interior radius of each hollow cavity is greater then the radius of the pole body which it is to receive by the thickness of the plastic coating to be provided;

means for sealing the gap developed between the received pole body and the interior walls of the hollow cavity, including a ring-shaped seal for sealing base portions of the poles and a cylindrical slide adapted for coaxial movement within said hollow cavity to contact and seal forwardmost end portions of the poles; and means for injecting said plastic into said gap.

9. The device of claim 8 wherein circumferential recesses are disposed over at least portions of the length of the interior walls of the hollow cavity.

10. The process of claim 1 wherein the ring-shaped gaps are simultaneously filled with the plastic melt.

11. The process of claim 5 wherein the cylindrical slide is caused to overfit the forwardmost ends of the poles, to prevent the application of said plastic coating on said forwardmost ends.

12. A process for the application of a plastic coating on selected body portions of a pair of cell poles of an electric battery, while leaving other body portions uncoated, after said pair of pole bodies have been cast in fixed position at a defined distance from one another on a completely assembled plate group which is held in proper position for mounting in a holding box, said process comprising the steps of:

cutting circumferential grooves into each of the pole bodies in the region to be coated with plastic;

moving the holding box with the pair of poles projecting forward toward an injection mold having separate matching hollow cavities spaced for receiving the poles;

sealing off the poles at their forwardmost ends and near their bases, along the circumference of their bodies, developing a ring-shaped gap between each pole body and the hollow cavity which surrounds it; and filling each of the ring-shaped gaps with a plastic melt by injection, coating the portions of each pole in said ring-shaped gap and leaving the remaining portions of each pole uncoated.

13. The process of claim 12 wherein said ring-shaped gap is developed by retractably advancing a cylindrical slide into contact with the forwardmost end of each of the poles.

* * * * *